United States Patent [19]

Morra

[11] Patent Number: 4,898,027

[45] Date of Patent: Feb. 6, 1990

[54] SYSTEM FOR MEASURING THE HEIGHT ABOVE GROUND LEVEL OF VEHICLES

[75] Inventor: Luigi Morra, Asti, Italy

[73] Assignee: Industrie Riunite SpA, Beinasco, Italy

[21] Appl. No.: 1,527

[22] Filed: Jan. 8, 1987

Related U.S. Application Data

[62] Division of Ser. No. 797,020, Nov. 12, 1985, Pat. No. 4,674,768.

[30] Foreign Application Priority Data

Nov. 15, 1984 [IT] Italy ................................ 23587 A/84

[51] Int. Cl.$^4$ ............................................ G01M 19/00
[52] U.S. Cl. ................................................... 73/118.1
[58] Field of Search ............. 73/118, 116, 11, DIG. 3, 73/118.1; 280/6 R, 6 H, 707, 703; 324/62 R, 63, 64 R, 65 R, 208, 71.1; 267/64.16; 336/110, 84 M, 115

[56] References Cited

U.S. PATENT DOCUMENTS

| 2,973,969 | 3/1961 | Thall ................................... 280/707 |
| 3,470,731 | 10/1969 | Zurawski ............................... 73/11 |
| 4,054,295 | 10/1977 | Elliott ................................. 280/707 |
| 4,127,814 | 11/1978 | Rasigade et al. ..................... 324/208 |
| 4,310,172 | 1/1982 | Claude et al. ........................ 280/703 |
| 4,401,946 | 8/1983 | Klimstra ............................. 324/208 |
| 4,471,304 | 9/1984 | Wolf ................................... 324/208 |

FOREIGN PATENT DOCUMENTS

0006401 1/1983 Japan .................................. 324/208

Primary Examiner—Robert R. Raevis
Attorney, Agent, or Firm—Robert P. Seitter

[57] ABSTRACT

A system for measuring a vehicle's height above ground level including a sensor which is preassembled and incorporated in the shock absorber of the vehicle eliminating assembly operations and fasteners in attaching the unit to the vehicle and protecting the sensor from impacts and the action of external agents due to its shielded position within the shock absorber.

4 Claims, 7 Drawing Sheets

SYSTEM FOR MEASURING THE HEIGHT ABOVE GROUND LEVEL OF VEHICLES

This is a division of application Ser. No. 797,020 filed Nov. 12, 1985, now U.S. Pat. No. 4,674,768.

BACKGROUND OF THE INVENTION

The present invention relates to a system for measuring a vehicle's height above ground level. More particularly, the system represents a considerable technical improvement as compared to such systems presently in use, both in regard to reliability and simplicity and consequent cost effectiveness in manufacture and assembly.

When the height above ground level of a vehicle must be known, measurement systems presently employed typically include a sensor located between the body (suspended mass) and the wheels (nonsuspended mass) of the vehicle.

The sensor is physically housed in a container which can be any one of many different shapes for being fitted between the body and a part connected to the wheels, such as an axle, trailing arm, stub axle, etc.

One or more body areas suitable for fitting the sensor must be selected, and one or more fasteners for securing the movable part of the sensor to the nonsuspended parts of the vehicle and for attaching the in-line assembly of the sensor must be provided.

The system to which the present invention relates eliminates these requirements since it employs at least one sensor that is preassembled and incorporated within the shock absorber of the vehicle. Fitting the sensor inside the shock absorber assures its physical protection and does away with the mounting operations and fasteners required for the sensors presently available on the market.

The system sensor may be any of the presently known and available types. Four sensor types contemplated for use in the invention are:

A potentiometric contact version, a version involving at least one Hall-effect sensor, a version involving an eddy current detector, and a version with an ultrasonic distance detector. Other sensors can be devised and the invention is not to be considered limited to these type sensors.

SUMMARY OF THE INVENTION

The present invention overcomes the shortcomings of the prior art by providing a position sensor incorporated into the shock absorber of the vehicle for sensing the position of the piston rod of the shock absorber relative to the bottom of the shock absorber.

According to a preferred embodiment of the invention, a resistance film is deposited on an inside wall of a working cylinder of the shock absorber and is contacted by an electrical slide contact on the piston of the shock absorber.

According to another embodiment of the invention, a Hall-effect transducer is employed including a magnet on the shock absorber piston and an end instrument on the working cylinder.

Another embodiment of the invention provides for a coil having primary and secondary windings to be affixed to the working cylinder for developing a magnetic field in one coil and inducing a current in the second coil as modulated by the moving piston of the shock absorber.

A still further embodiment of the invention provides for an ultrasonic emitter mounted on the piston of the shock absorber and a reflecting element on the bottom of the shock absorber. Reflected sound is processed for providing an indication of the position of the piston relative to the bottom of the shock absorber.

BRIEF DESCRIPTION OF THE DRAWING

The advantages, characteristics, and operation of the system according to the present invention will clearly appear from the following Detailed Description Of The Preferred Embodiment when taken in conjunction with the drawings of which.

DETAILED DESCRIPTION OF THE PREFERRED EMBODIMENT

Referring to the different figures in the drawings, it is to be understood that they show, merely as an example, a Mac Pherson strut, but this in no way shall restrict the application of the system according to the present invention to this particular type of shock absorber. Identical reference numbers indicate identical or equivalent parts of the system versions illustrated herein.

Figure 1:
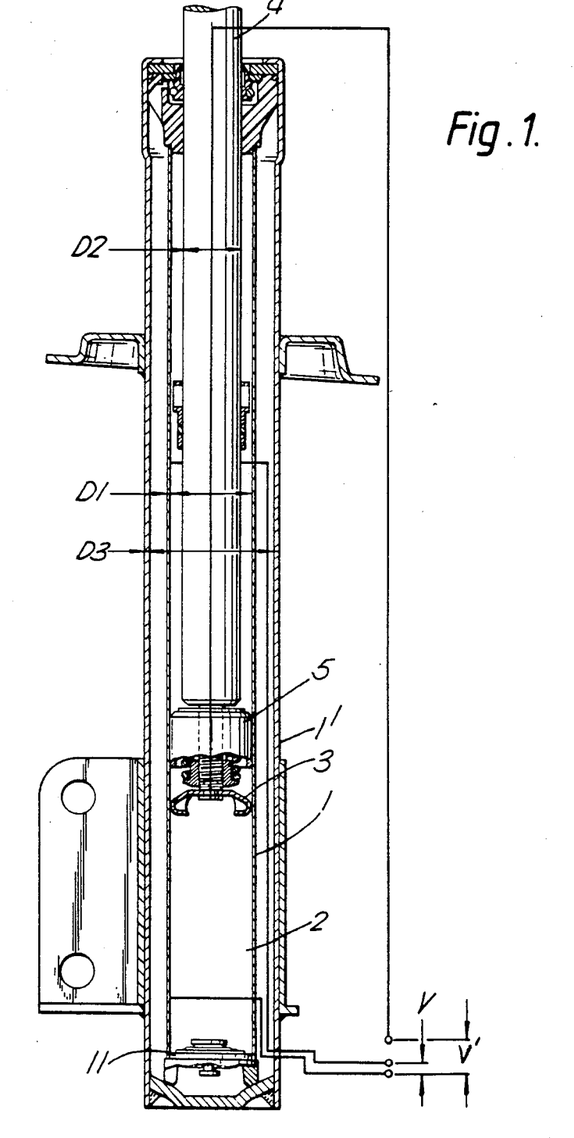
FIG. 1 is a partial, elevation cross-sectional view of a shock absorber employing a preferred embodiment of the system according the present invention incorporating a potentiometric contact version.

FIG. 1 shows an embodiment incorporating a potentiometrical contact.

A resistance film 2, across which a voltage V is applied, is deposited on an inside wall of a work cylinder 1 which is closed at its lower end by a closure member 11 and mounted within the container 1 of a shock absorber. A pick-up slide 3 secured either to a piston rod 4 or to a piston 5 of the shock absorber slides along the resistance film 2 and picks up a voltage signal V', which changes with the axial position of the piston 5 within the working cylinder 1, so that a direct reading of its height from the ground may be displayed on a suitably calibrated scale located, for instance, on the instrument panel of the vehicle.

Figure 2:
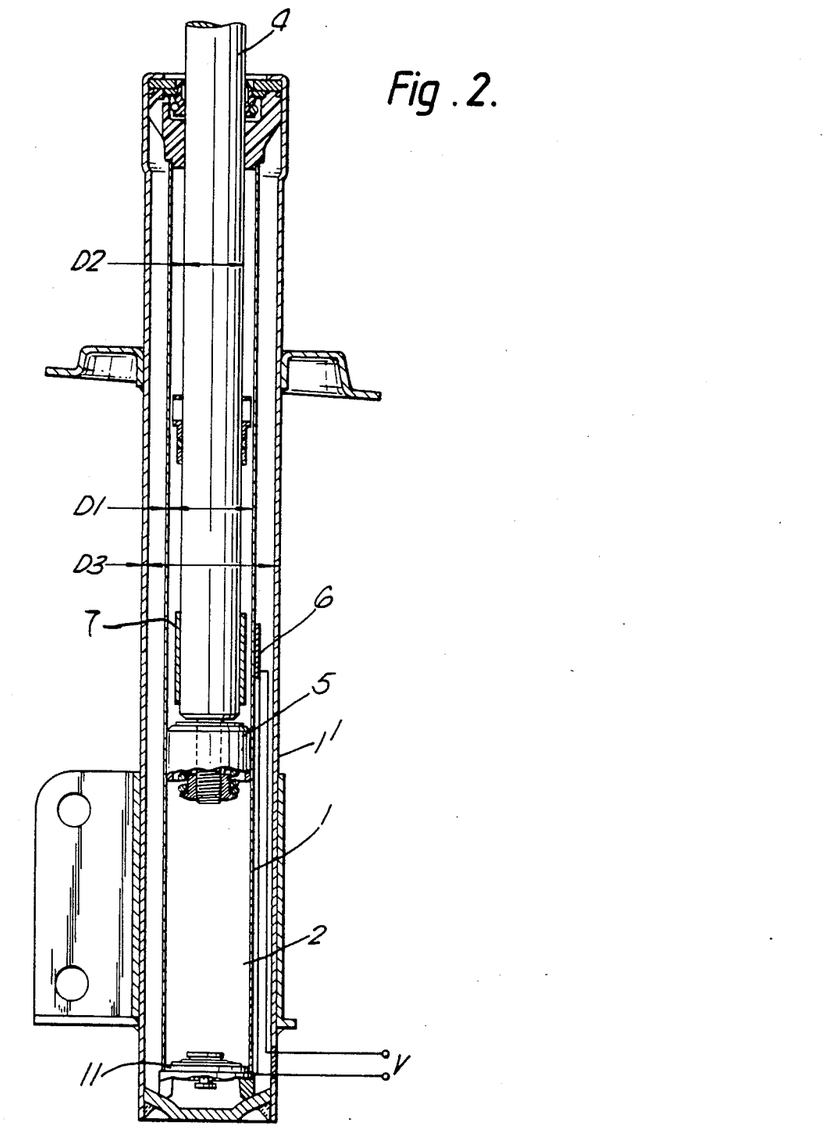
FIG. 2 is a partial, cross-sectional elevational view of a shock absorber showing another embodiment of the system incorporating a Hall-effect sensor.

FIG. 2 shows an embodiment incorporating a sensor operating on the principle of the well-known Hall effect incorporating a permanent magnet. In accordance with this effect, any magnetic material brought into close proximity with the sensor will result in an output voltage which varies directly with the magnetic field density produced.

A ring-shaped magnet 7 is secured to the piston rod 4 of the shock absorber and a Hall-effect sensor 6 is fixed to the outer face of cylinder 1 which, in this case, is made of a nonmagnetic material. The sensor 6 supplies a voltage signal, V, modulated according to the axial distance between the magnet and the sensor. It is also possible to use more than one magnet and/or more than one sensor and to invert their mutual position.

Figure 3:
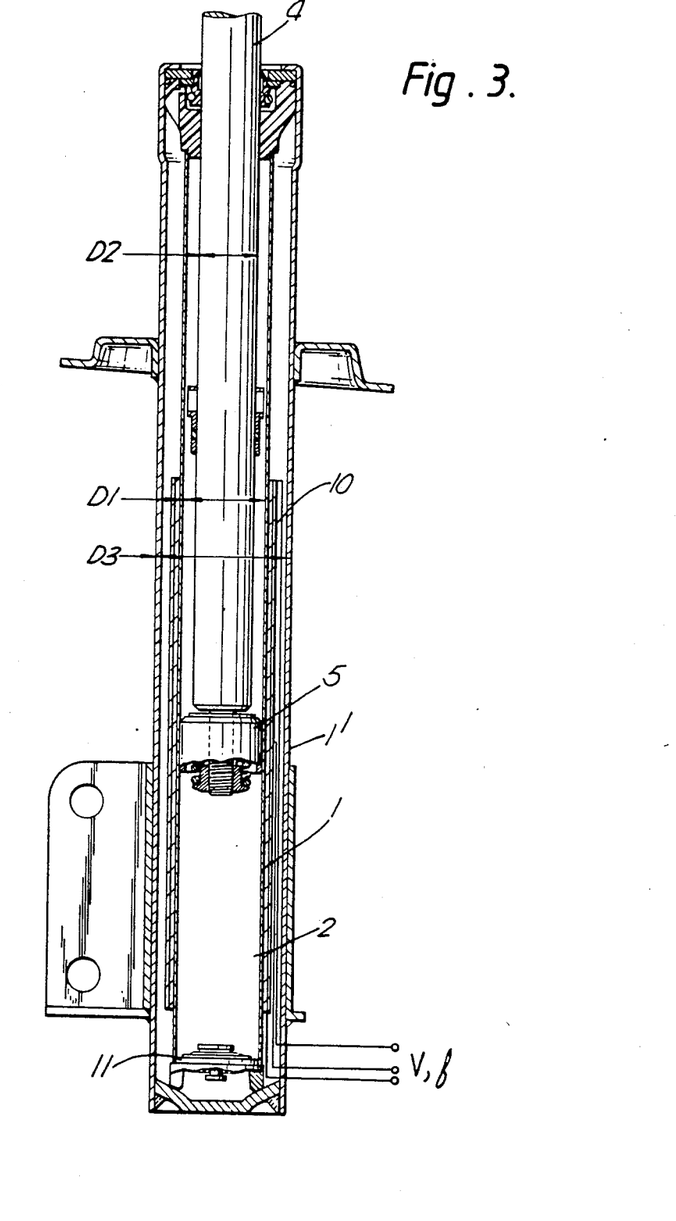
FIG. 3 is a partial, cross-sectional elevational view of a shock absorber mounting showing a third embodiment of the system incorporating an eddy current detector.

FIG. 3 shows an embodiment incorporating an eddy current detector. A cylindrical coil 10 having a primary winding and a secondary winding incorporated into an insulating material is coupled to a voltage/frequency V,f generator and is affixed onto the outer surface of the cylinder 1. When the magnetic flux, which is present within the coil, is interrupted by a conductive material such as, for example, the piston 5 moving within the cylinder 1, a decrease in the strength of the high-frequency signal across the coil will take place by the action of the induced currents.

By considering the assembly as a transformer, the effects due to the energy dissipated by the secondary winding are carried over to the primary winding by introducing an equivalent impedance.

By operating over limited distances and with a suitable calibration range, it is possible to obtain a linear relationship between the output voltage of the coil and the axial position of the piston 5 within the coil 10.

Other embodiments incorporating the eddy current-type sensor system are also possible. For example, the primary and secondary windings of the coil 10 can be separated and arranged in a different manner, such as, for instance, field coils can be affixed to the cylinder 1 and introduced coils can be keyed onto the piston rod 4. In any case, the system measures the position of piston and, therefore, the body of the vehicle relative to the bottom of the shock absorber.

Figure 4:
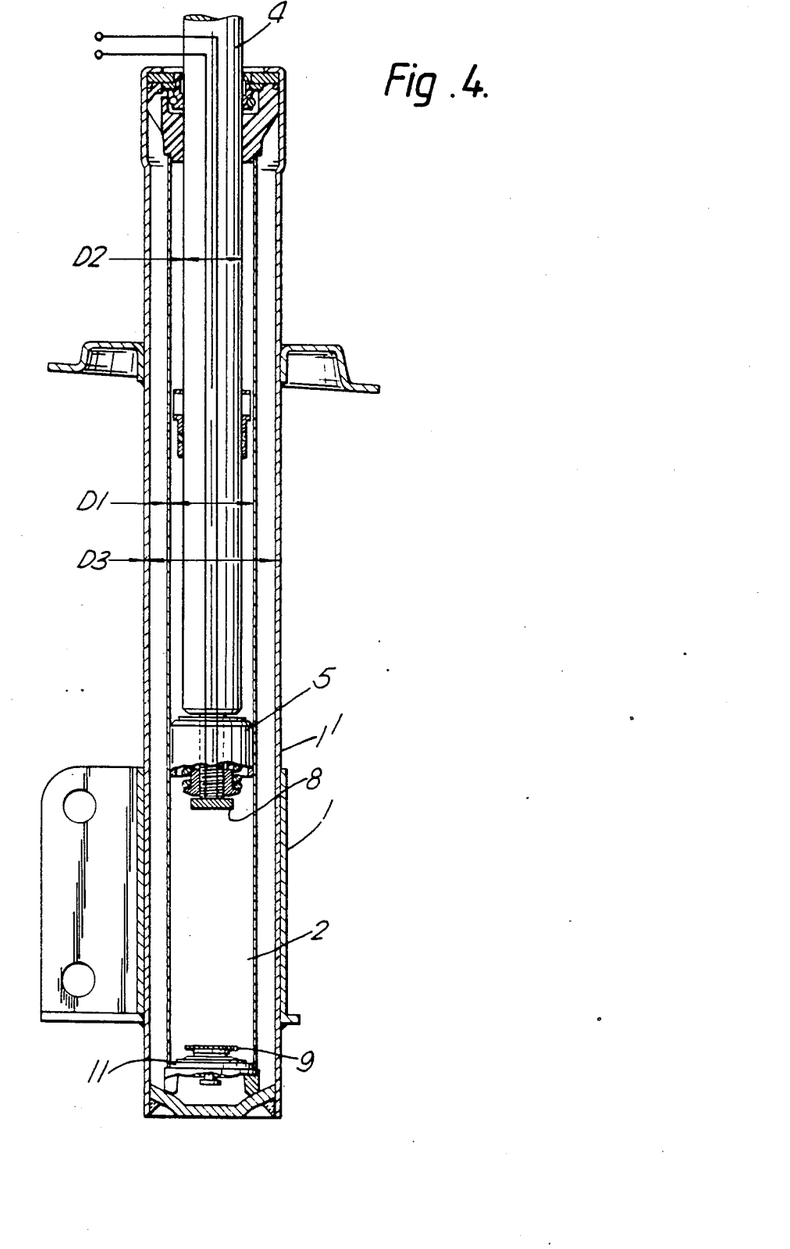
FIG. 4 is a partial, cross-sectional elevational view of a shock absorber mounting showing a fourth embodiment of the system incorporating an ultrasonic distance detector.

FIG. 4 shows the embodiment incorporating an ultrasonic distance detector. On the piston 4 under the piston rod 5 there is fitted an ultrasonic quartz emitter 8 which sends a reference signal to an acoustically reflecting plate 9. A reflected signal returns to the quartz emitter 8 which also acts as an end instrument and which is coupled to an electronic device which receives, recognizes, demodulates, and converts the incoming signal into a voltage which is proportional to the distance covered by the ultrasonic wave in reaching the reflecting plate 9.

In all of the above mentioned embodiments, that is, according to FIGS. 1, 2, 3 and 4, a continuous output signal from the particular sensor varies between two values indicating the two extreme positions of the wheels with respect to the body.

Figure 5:
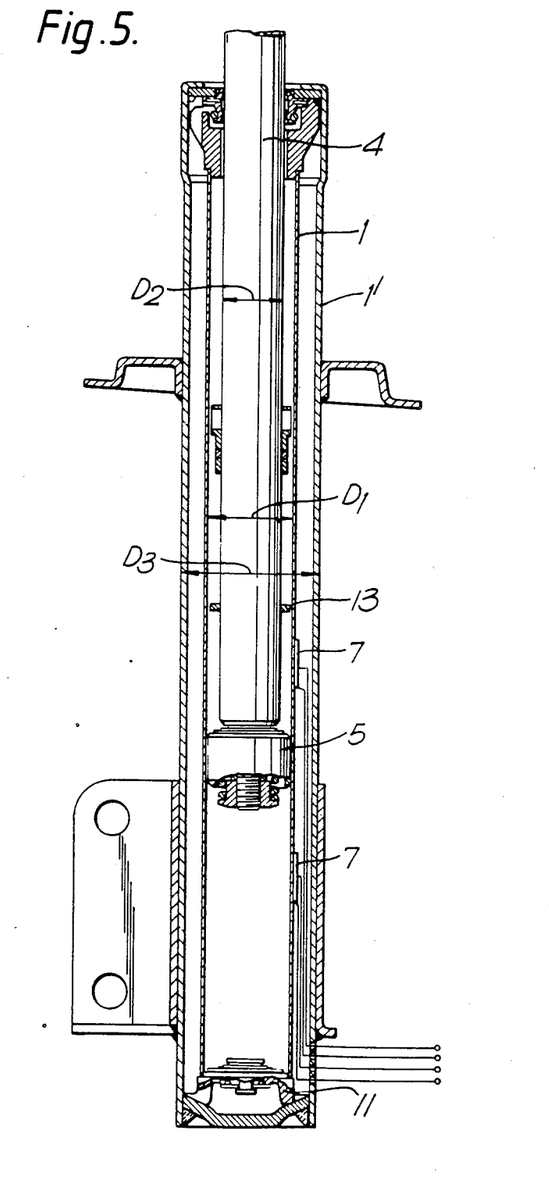
FIG. 5 is a partial, cross-sectional elevational view of a shock absorber showing details of construction of another embodiment of the system incorporating a Hall-effect sensor.
Figure 6:
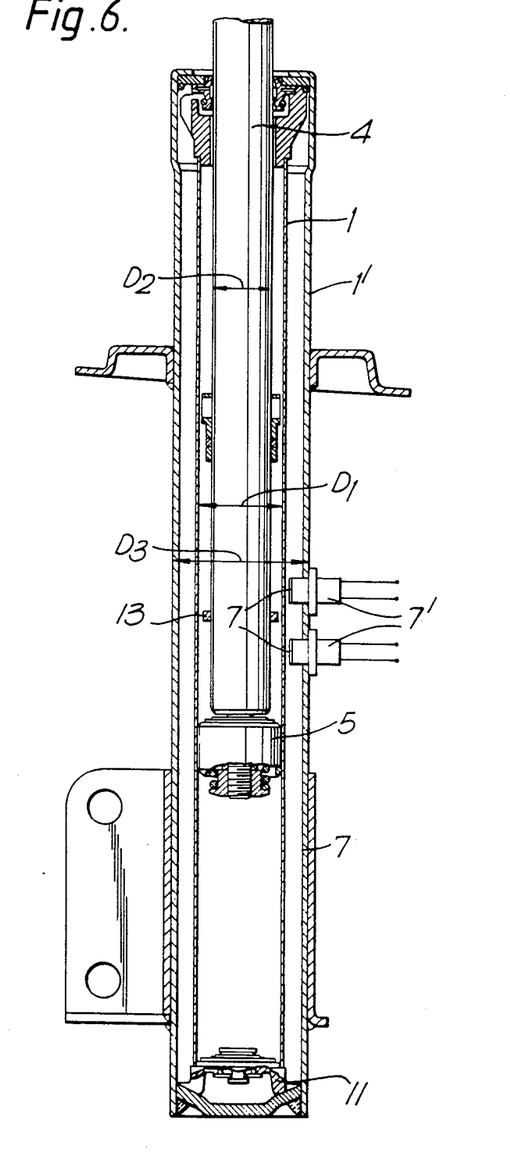
FIG. 6 is a partial, cross-sectional view of a shock absorber showing details of construction of a still further embodiment of the system incorporating a Hall-effect sensor.
Figure 7:
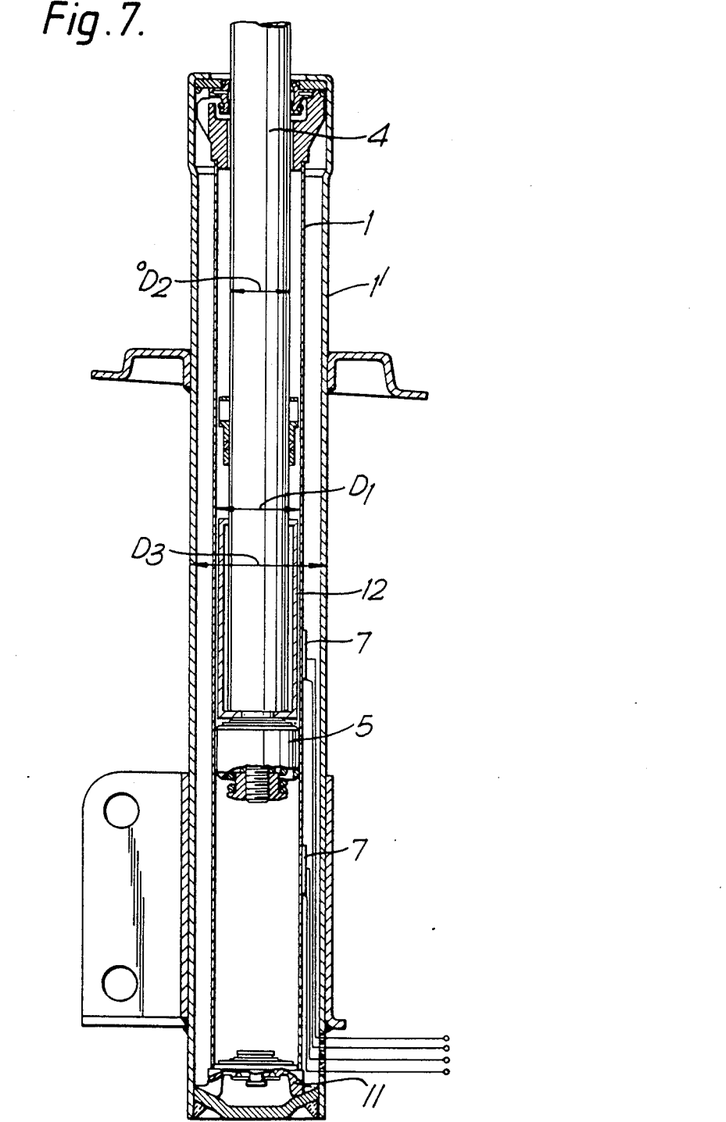
FIG. 7 is another embodiment of the system also incorporating a Hall-effect sensor showing details of construction.

Moreover, in the embodiment involving the Hall-effect sensor, it is not necessary that the sensor exciter consists of a permanent magnet but it may be replaced by any means made of suitable magnetic material, as it is evident from the further versions of this embodiment, illustrated in FIGS. 5 to 7.

FIG. 5 shows a first variation of the embodiment involving Hall-effect sensor. On the outer surface of the cylinder 1, which in this case is made of nonmagnetic material (e.g. aluminum alloy, stainless steel and so forth), there are fixed two Hall-effect sensors 7 capable to provide a voltage signal when faced by a magnetized piston 5 or any other magnetized material such as 13. When the magnetized piston 5 or the ring 13 passes by the sensors 7, signals forming a position reading code of the piston 5 are released.

FIG. 6 shows a second variation of the embodiment involving the Hall-effect sensors. Two spark plug formed supports 7' each supporting a Hall-effect sensor 7 are fixed to the shock absorber housing 1'; the sensing surface of said sensor is facing the nonmagnetic material cylinder 1. The operation is the same as that described in relation to the embodiment of FIG. 5. When the piston 5 or the ring 13 passes by the sensors 7, signals defining a position of the piston 5 are obtained.

In this case, it is sufficient to drill two holes in the shock absorber's outer case 1' to mount the sensors with the evident greatest ease in using the system.

FIG. 7 shows a third variation of the embodiment involving the Hall-effect sensors. The sensors 7 can be wall mounted, either inside the shock absorber housing 1 as shown in FIG. 5, or screwed into the shock absorber housing 1' as shown in FIG. 6. Both sensors 7 sense the eventual presence of the piston rod/piston (4,5) assembly in front of them and not just the passage of the piston 5 or the ring 13 as in the other variations of the embodiment. The voltage signals obtained from sensors 7 define a position of the piston 5. A further system variation, also shown in FIG. 7, includes fixing to the piston rod 4 a cylindrical pierced cage 12 made of magnetic material which permits the passage of the oil during the operation of the shock absorber and provides the magnetic material mass capable of exciting the sensors 7. Such solution can be used in place of the aforementioned magnetized piston 5 or ring 13, when the piston rod is too far from sensors 7.

It can be seen that the system, according to the present invention, solves in a simple manner the problem of fitting the sensors inside the shock absorber and offers a wide range of solutions and advantages over present techniques.

The inside construction of the shock absorber provides for placement of the sensor in an area protected against accidental impacts and environmental conditions.

The main advantage of the present invention is found in the fact that nothing must be added to the vehicle to accommodate the system, no fastening areas must be provided and no assembly and adjustment time is required.

It must also be stressed that numerous variations, changes, additions and/or modifications may be made and those changes, additions, and modifications are to be considered to be within the scope of the appended claims.

What is claimed is:

1. A system for measuring the height above ground level of vehicles comprising, a Hall-effect position detector means mounted within a housing of a shock absorber including at least one ring-shaped magnet fixed to a piston rod mounted in a working cylinder of the shock absorber and at least one sensor means mounted on an outer face of said working cylinder, said working cylinder being non-magnetic and said sensor means generating a voltage signal modulated according to a distance between said magnet and said sensor means, whereby the position of said piston rod relative to said working cylinder is sensed.

2. The system according to claim 1, wherein the sensor means is housed in a spark plug formed support which is fixed to the shock absorber housing.

3. A system according to claim 1, wherein the sensor means detects the presence of the piston rod and an attached piston in the proximity of said sensor means.

4. A system according to claim 1, wherein a pierced cylindrical cage made of magnetic material is fixed to the piston rod in place of the ring-shaped magnet, said cage permitting the passage of an oil in said shock absorber during the shock absorber operation and supplying a magnetic material mass capable of exciting the sensor means.

* * * * *